United States Patent [19]

Scarpa

[11] Patent Number: 5,636,250
[45] Date of Patent: Jun. 3, 1997

[54] AUTOMATIC VSB/QAM MODULATION RECOGNITION METHOD AND APPARATUS

[75] Inventor: Carl G. Scarpa, Edison, N.J.

[73] Assignee: Hitachi America, Ltd., Tarrytown, N.Y.

[21] Appl. No.: 354,303

[22] Filed: Dec. 13, 1994

[51] Int. Cl.⁶ .............................. H04L 27/06; H04N 5/44
[52] U.S. Cl. .......................... 375/321; 375/344; 375/350; 348/725
[58] Field of Search ................................. 375/224, 261, 375/270, 321, 345, 350, 344; 348/725, 726; 455/203, 204, 47

[56] References Cited

U.S. PATENT DOCUMENTS

| | | | |
|---|---|---|---|
| 4,994,769 | 2/1991 | Kishi | 375/321 X |
| 5,241,688 | 8/1993 | Arora | 455/51.1 |
| 5,264,937 | 11/1993 | Christopher | 348/725 |
| 5,452,015 | 9/1995 | Hulyalkar | 348/608 |
| 5,487,186 | 1/1996 | Scarpa | 455/192.2 |
| 5,506,636 | 4/1996 | Patel | 348/725 |
| 5,548,617 | 8/1996 | Patel et al. | 375/316 |
| 5,557,337 | 9/1996 | Scarpa | 348/558 |
| 5,565,932 | 10/1996 | Citta et al. | 348/678 |

*Primary Examiner*—Young T. Tse
*Attorney, Agent, or Firm*—Michaelson & Wallace; Michael P. Straub; Peter L. Michaelson

[57] ABSTRACT

Methods and apparatus for automaticly distinguishing between QAM and VSB modulated signals and, for implementing an automatic VSB/QAM modulation recognition circuit are described. In accordance with various described embodiments, a narrow digital passband filter is used to sweep across the frequency region of a received HDTV signal where a VSB pilot tone would be located if the received signal is a VSB signal. The power of the filtered HDTV signal is estimated and compared to various preselected thresholds. If a power threshold value indicative of the presence of a VSB pilot tone is exceeded VSB is declared present. If no VSB pilot tone is detected, as indicated by the measured signal power levels, receipt of a QAM signal is declared. Various methods of insuring that transient changes in a received signal do not result in an erroneous decision with regard to the type of demodulation to perform are also described.

20 Claims, 10 Drawing Sheets

FIG. 8

TABLE OF QUANTIZED COS(f) VALUES TO 121 BITS OF PRECISION

| NORMALIZE FREQ. | COS(∅) | QUANTIZED (11 BITS) | BIT SEQUENCE |
|---|---|---|---|
| 0.120000000000 | 0.728968627421 | 0.729003906250 | 0.10111010101 |
| 0.120078125000 | 0.728632513335 | 0.728515625000 | 0.10111010100 |
| 0.120156250000 | 0.728296223679 | 0.728515625000 | 0.10111010100 |
| 0.120234375000 | 0.727959758535 | 0.728027343750 | 0.10111010011 |
| 0.120312500000 | 0.727623117985 | 0.727539062500 | 0.10111010010 |
| 0.120390625000 | 0.727286302108 | 0.727050781250 | 0.10111010001 |
| 0.120468750000 | 0.726949310986 | 0.727050781250 | 0.10111010001 |
| 0.120546875000 | 0.726612144701 | 0.726562500000 | 0.10111010000 |
| 0.120625000000 | 0.726274803333 | 0.726074218750 | 0.10111001111 |
| 0.120703125000 | 0.725937286964 | 0.726074218750 | 0.10111001111 |
| 0.120781250000 | 0.725599595675 | 0.725585937500 | 0.10111001110 |
| 0.120859375000 | 0.725261729548 | 0.725097656250 | 0.10111001101 |
| 0.120937500000 | 0.724923688665 | 0.725097656250 | 0.10111001101 |
| 0.121015625000 | 0.724585473105 | 0.724609375000 | 0.10111001100 |
| 0.121093750000 | 0.724247082951 | 0.724121093750 | 0.10111001011 |
| 0.121171875000 | 0.723908518285 | 0.724121093750 | 0.10111001011 |
| 0.121250000000 | 0.723569779188 | 0.723632812500 | 0.10111001010 |
| ⋮ | ⋮ | ⋮ | ⋮ |
| 0.129609375000 | 0.686334200493 | 0.686523437500 | 0.10101111110 |
| 0.129687500000 | 0.685977111990 | 0.686035156250 | 0.10101111101 |
| 0.129765625000 | 0.685619858196 | 0.685546875000 | 0.10101111100 |
| 0.129843750000 | 0.685262439197 | 0.685058593750 | 0.10101111011 |
| 0.129921875000 | 0.684904855079 | 0.685058593750 | 0.10101111011 |

AUTOMATIC VSB/QAM MODULATION RECOGNITION METHOD AND APPARATUS

FIELD OF THE INVENTION

The present invention is directed to methods and apparatus for automatically distinguishing between QAM and VSB modulated signals and, more particularly, to a method and apparatus for implementing an automatic VSB/QAM modulation recognition circuit.

BACKGROUND OF THE INVENTION

The use of quadrature amplitude modulation ("QAM") and vestigial sideband ("VSB") modulation for transmitting data, such as high definition television ("HDTV") signals, is growing in popularity.

In the United States, HDTV systems, which include, e.g., Advanced television ("ATV") systems, appear to be headed in two different directions with regard to the type of modulation used to transmit television signals.

At present, cable companies in the United States are preparing to transmit HDTV digital signals over cable using a QAM technique of data transmission.

On the other hand, the terrestrial television industry in the U.S. is planning to broadcast digital HDTV, e.g., ATV signals, using a Vestigial SideBand ("VSB") technique of data transmission proposed by Zenith corporation/Grand Alliance.

Accordingly, to be capable of receiving and displaying both cable and terrestrial HDTV television transmissions, a television receiver will have to be capable of receiving and demodulating both QAM and 8 VSB HDTV signals.

Because the method used to demodulate QAM signals is different from the method used to demodulate VSB signals, a demodulator receiving a HDTV signal should be controlled so that it applies the correct demodulation method to a received signal. While the manual selection of the appropriate demodulation mode offers one solution to the problem, methods and apparatus for automaticly determining which of the two possible demodulation techniques is appropriate are desirable.

Furthermore, it is desirable that the automatic methods of determining the appropriate demodulation technique be able to distinguish between the two HDTV modulation formats without requiring demodulation of the received signal. In addition, the selection of the appropriate demodulation technique should generally be independent of transmission channel conditions, e.g., signal channel noise. HDTV signal channel noise may include, e.g., NTSC television signals broadcast by adjacent television transmitters in the same broadcast channel in which a HDTV signal is being broadcast.

SUMMARY OF THE PRESENT INVENTION

The present invention is directed to methods and apparatus for implementing an automatic VSB/QAM modulation recognition circuit.

In accordance with one method of the present invention, localized power about the band edge of a received HDTV signal is measured and used to determine if a VSB pilot tone indicative of a VSB signal is present. A narrow bandwidth passband filter, e.g., a recursive bi-quadratic digital passband filter, is made to slide across a fixed frequency range by changing weights within the digital passband filter.

In accordance with one exemplary embodiment, the weights that control the center frequency of the digital passband filter are values of a cosine wave that are calculated for the preselected frequency search region. These calculated values are linearized and then produced by the use of a simple counter thereby avoiding the need for a lookup table of cosine values.

As the digital passband filter is swept across the search region of the HDTV signal, the passband filter's output signal is applied to a power estimation circuit which generates an estimate of the power of the filtered HDTV signal. As the passband filter sweeps, the output of the power estimation circuit provides an indication of the power that is found in the HDTV signal across the search region.

If a VSB signal is present, a large peak in the output of the power estimation circuit occurs when the passband filter is approximately centered with the location of the VSB pilot tone. If a QAM signal is present, the output levels of the power estimation circuit will be much lower and essentially constant across the search region.

The difference between the power measured with a QAM signal versus a VSB signal is used to determine when a VSB as opposed to a QAM signal is present.

Various methods which compare the estimated power of the filtered HDTV signal, reflecting the signal power at the passband of the digital passband filter, to various threshold power levels, are used to distinguish between a received QAM and VSB signal in various embodiments of the present invention.

BRIEF DESCRIPTION OF THE DRAWINGS

FIG. 8 is a table of quantized cosine frequency values which are represented using 11 bits of precision.

DETAILED DESCRIPTION

The present invention is directed to methods and apparatus for automaticly distinguishing between QAM and VSB modulated signals and, more particularly, to a method and apparatus for implementing an automatic VSB/QAM modulation recognition circuit.

Figure 1:
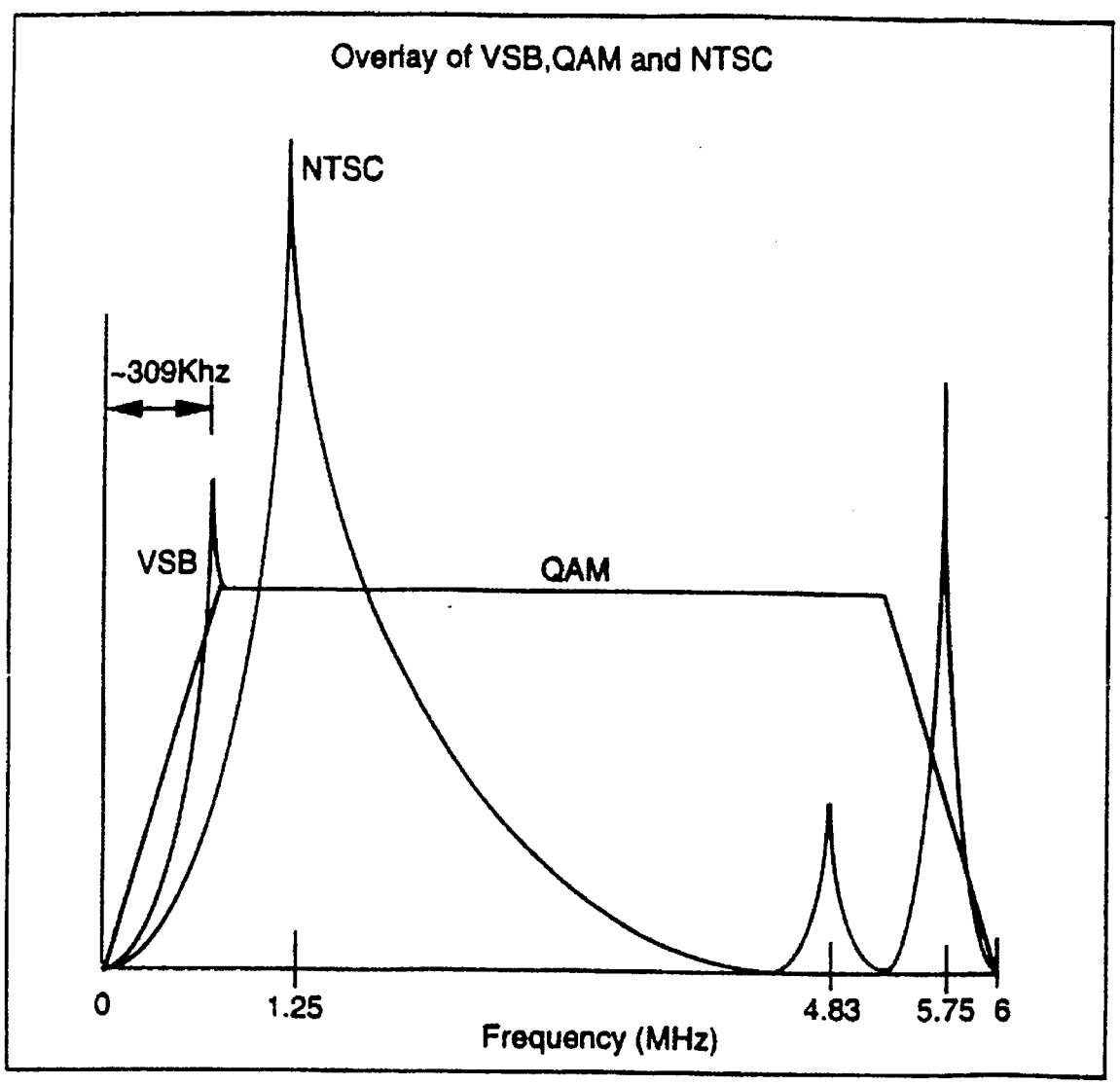
FIG. 1 is a diagram showing an overlay of a VSB, a QAM and an NTSC television signal occupying a 6 MHz transmission channel.

Referring now to FIG. 1, there is illustrated a diagram showing an overlay of a VSB HDTV signal, a QAM HDTV signal and an NTSC television signal occupying a 6 MHz bandwidth corresponding to, e.g., the bandwidth of a television channel. As illustrated, the VSB signal includes a peak corresponding to a carrier pilot tone located approximately 309 KHz from the start of the 6 MHz television channel. The QAM signal, on the other hand, is generally a relatively flat signal without any significant spikes or peaks. The NTSC television signal, in contrast to the QAM and VSB signals, includes a plurality of peaks corresponding to, e.g., a picture carrier, a chrominance subcarrier, and an audio carrier signal component. As illustrated in FIG. 1, these NTSC spikes are located at approximately 1.25, 4.83 and 5.75 MHz from the start of the 6 MHz television channel.

Figure 2:
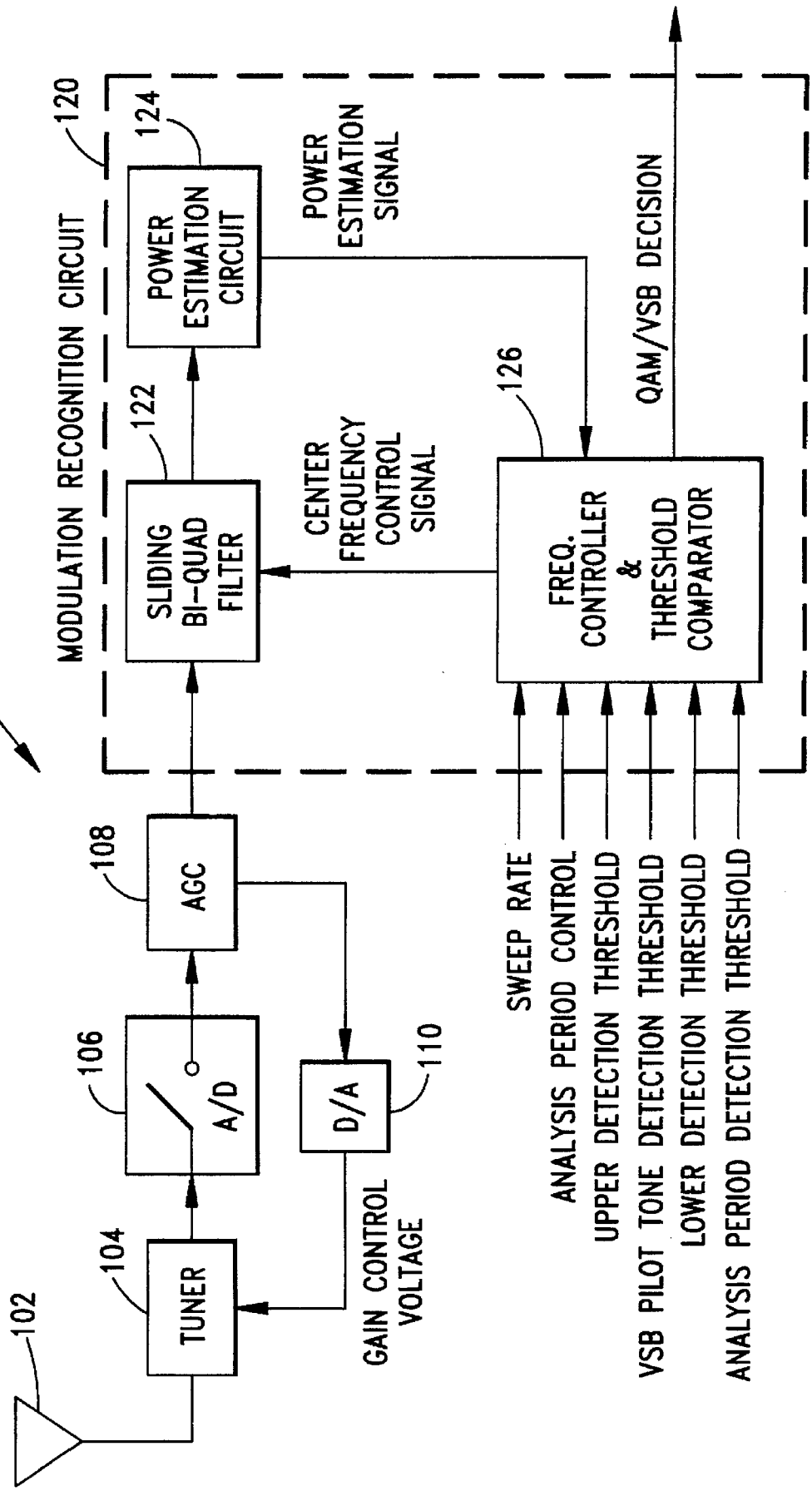
FIG. 2 is a schematic block diagram of a receiver circuit including a modulation recognition circuit implemented in accordance with an exemplary embodiment of the present invention.

Referring now to FIG. 2, there is a receiver circuit 100 which includes an automatic VSB/QAM modulation recognition circuit 120 implemented in accordance with one embodiment of the present invention. In addition to the modulation recognition circuit 120, the receiver circuit 100, includes an antenna 102, a tuner 104, an A/D converter 106, an automatic gain control ("AGC") circuit 108 and a digital to analog converter circuit 110.

A HDTV signal, which may be, e.g., either a QAM or VSB signal, is received through the tuner 104 which provides for channel selectivity and amplification of the received signal. The tuner's output signal is supplied to the input of the A/D converter 106 which digitizes the received HDTV signal. The digital HDTV signal is then supplied to the AGC circuit 108 which is responsible for controlling the gain of the HDTV signal. The AGC circuit has an amplitude control signal output which is coupled to a gain control signal input of the tuner 104 via the D/A converter 110. In this manner, the AGC circuit controls the gain of the digital HDTV signal via the use of a gain control feedback signal generated by the AGC circuit 108. In addition to generating the gain control signal, after controlling the gain of the received HDTV signal, the AGC circuit 108 outputs the digital HDTV signal which is supplied to the modulation recognition circuit 120 of the present invention.

The modulation recognition circuit 120 includes a sliding passband filter 122, e.g., a sliding bi-quadratic filter, a power estimation circuit 124 and a frequency controller and threshold comparator ("FCTC") module 126.

As illustrated in FIG. 2, the sliding passband filter 122 receives the digital HDTV signal from the AGC circuit 108 and a center frequency control signal from the FCTC module 126. The filter 122, filters the received HDTV signal to generate a filtered HDTV signal representing the portion of the received HDTV signal that is passed by the sliding passband filter 122. A filtered signal output of the sliding passband filter 122 is coupled to the input of a power estimation circuit 124 which is used to estimate the power of the filtered HDTV signal. The output of the power estimation circuit, which is a signal representing the power of the filtered HDTV signal, is supplied to a corresponding power level input of the FCTC module 126.

In addition to receiving the power level signal from the power estimation circuit 124, the FCTC circuit 126 has an input for receiving a sweep rate control value, an analysis period value, an upper detection threshold signal input, a lower detection threshold signal input, a VSB pilot tone detection threshold input and an analysis period detection threshold signal input. As will be discussed below some of these inputs are not used in particular embodiments of the present invention. Inputs which are not used in a particular embodiment may be omitted from the particular embodiment. While, in the illustrated embodiment of FIG. 2, the sweep rate, analysis period control, and detection threshold values are shown as inputs to the FCTC module which is programmable with regard to these values, the FCTC module may be programmed with preselected fixed values for the parameters at the time of manufacture, thereby alleviating the need to provide the capacity to input such values at a later time or permit the alteration of the stored parameter values.

It should be noted that the sweep rate signal, which has a value N, where N is an integer, is used in combination with the system clock signal, to control the rate at which the center frequency of the sliding passband filter 122 changes from one frequency to another. In the embodiments illustrated in FIGS. 5A and 5B, the center frequency of the sliding passband filter 122 changes once for every N system clock cycles. Thus, the center frequency of the sliding passband filter 122 remains fixed at a specific frequency for a period equal to N system clock cycles.

The analysis period control signal has an integer value M, where M is greater then N. In a second embodiment of the present invention, the analysis period control signal is used to control the duration of analysis periods. Each analysis period has a duration of M system clock cycles. In accordance with this second embodiment, at the end of each analysis period a determination is made regarding the type of signal being received. Because the duration of each analysis period exceeds the amount of time that the passband filter remains at any one frequency, since M>N, in the second embodiment, the determination of the type of signal being received is based upon power estimates made at multiple frequencies. Ideally, in such a case, M should exceed N by an amount sufficient to insure that the sliding passband filter 122 scans the entire frequency region in which a VSB pilot tone may be located before a determination of the type of signal being received is made.

Generally, the modulation recognition circuit 120 of the present invention operates by searching for the presence of a VSB pilot tone in the received HDTV signal. If the received HDTV signal is a QAM signal, no pilot tone will be detected and the FCTC module will generate a decision signal indicating that the received FLDTV signal is a QAM signal. However, when a VSB pilot tone is detected a VSB decision signal will be generated.

In order to detect the presence or absence of a VSB pilot tone, the center frequency of the sliding passband filter 122 is moved across a preselected frequency region of the received HDTV signal where it is anticipated that a VSB pilot tone will be found when the received HDTV signal is a VSB signal. The preselected frequency region corresponds to the lower band edge of a VSB signal when the VSB signal is similar to the one illustrated in FIG. 1. The preselected frequency region should be small enough so that an NTSC picture carrier signal component of an NTSC signal will fall outside the preselected frequency search region.

To allow for frequency offsets, e.g., resulting from tuner inaccuracies, the passband filter 122 is made to slide across a limited region centered about the expected pilot tone location, i.e., the preselected frequency region discussed above. This sliding filtering is performed by, e.g., a bi-quadratic passband filter 122, whose weights, which control the center frequency of the passband filter 122, are made to vary. In accordance with the present invention, the varying weights are controlled by a simple counter, e.g., the counter 162 of FIG. 5A and 5B, which is part of the FCTC module.

The estimation of the filtered HDTV signal power can be performed, in accordance with the present invention, using a relatively easy to implement circuit 124' that takes the absolute value of the filtered HDTV signal's amplitude and applies it to a low pass filter. The output of this operation, which represents the estimated power of the filtered HDTV signal, is supplied to the FCTC module 126.

The FCTC module 126 compares the estimated power of the filtered HDTV signal to one or more predetermined threshold values.

The upper and lower detection thresholds are used, in accordance with the first embodiment of the present invention, to distinguish between the presence or absence of a VSB signal.

In accordance with the first embodiment, when the estimated power of the filtered HDTV signal exceeds the upper threshold value, Tu, the FCTC module 126 generates a decision signal indicating that a VSB pilot tone has been detected indicating that a VSB signal is being received. In accordance with this first embodiment, once the preselected upper threshold power value is exceeded, the incrementing of the counter 162 is stopped effectively stopping the sliding filter 122 from further scanning the frequency search region for a VSB pilot tone. If the estimated power of the filtered HDTV signal drops below the lower detection threshold, no VSB pilot tone is detected and QAM modulation is declared. This results in the QAM/VSB decision signal output of the FCTC module 120 being set to indicate that a QAM signal is being received.

If the estimated power level falls between the upper and lower detection thresholds no decision is made with regard to the type of signal being received and the state of the QAM/VSB decision signal is allowed to remain unchanged. Accordingly, in this first embodiment, the state of the QAM/VSB decision signal will not be changed unless the estimated power level exceeds the upper detection threshold or falls below the lower detection threshold. This provides a hysteresis effect with regard to the generation of the QAM/VSB decision signal. This hysteresis effect prevents changes in the QAM/VSB decision signal when the estimated power level of the filtered HDTV signal is a value which can not be used to clearly distinguish between a VSB and a QAM signal, i.e., when the estimated power level is in an indeterminate state with regard to the presence or absence of a VSB signal.

Exemplary values, in the first embodiment, for the sweep rate signal, upper detection threshold and lower detection threshold are 8192, 0.4 and 0.2, respectively, assuming a 20 MHz system clock.

In accordance with the second embodiment of the present invention, the VSB pilot tone detection threshold and the analysis period detection threshold are used, in conjunction with the analysis period control signal, to determine the presence or absence of a VSB pilot tone.

If the estimated power level of the filtered HDTV signal exceeds the VSB pilot tone detection threshold, it indicates that a VSB pilot tone is probably present in the received signal. The analysis period detection threshold is used as a secondary check to insure that the presence of VSB will not be erroneously declared as the result of the VSB pilot tone detection threshold being exceeded due to transient conditions.

In accordance with the second embodiment of the present invention, the QAM/VSB decision is made at the end of each analysis period. Each analysis period has a time duration equal to the duration of a system clock cycle times the value M of the analysis period control signal.

In accordance with the second embodiment of the present invention, the counter 163 is allowed to continuously increment, i.e., the counter 163 is not stopped as a result of a detection threshold being exceeded. A count of the number of times during the analysis period the estimated power level of the filtered HDTV signal exceeds the preselected VSB pilot tone detection threshold is maintained. In accordance with this second embodiment, VSB is declared present if the count exceeds a preselected number indicated by the analysis period detection threshold value. If, at the end of an analysis period, the count does not exceed the preselected analysis period detection threshold value, QAM is declared and the QAM/VSB decision signal is set to a value indicative of the receipt of a QAM signal.

In such an embodiment, because multiple samples are used to determine if a VSB pilot tone is present, the VSB pilot tone detection threshold can be set somewhere between the upper and lower detection thresholds of the first embodiment without producing erroneous results that might otherwise occur do to, e.g., transient noise.

Exemplary values, in the second embodiment, for the sweep rate signal, analysis period control signal, VSB pilot tone detection threshold, and analysis period detection threshold are 8192, 2097152, 0.25 and 3, respectively, assuming a 20 MHz system clock.

Each of the various components 122, 124, 126 of the modulation recognition circuit 120 of the present invention will now be described in detail.

Figure 3:
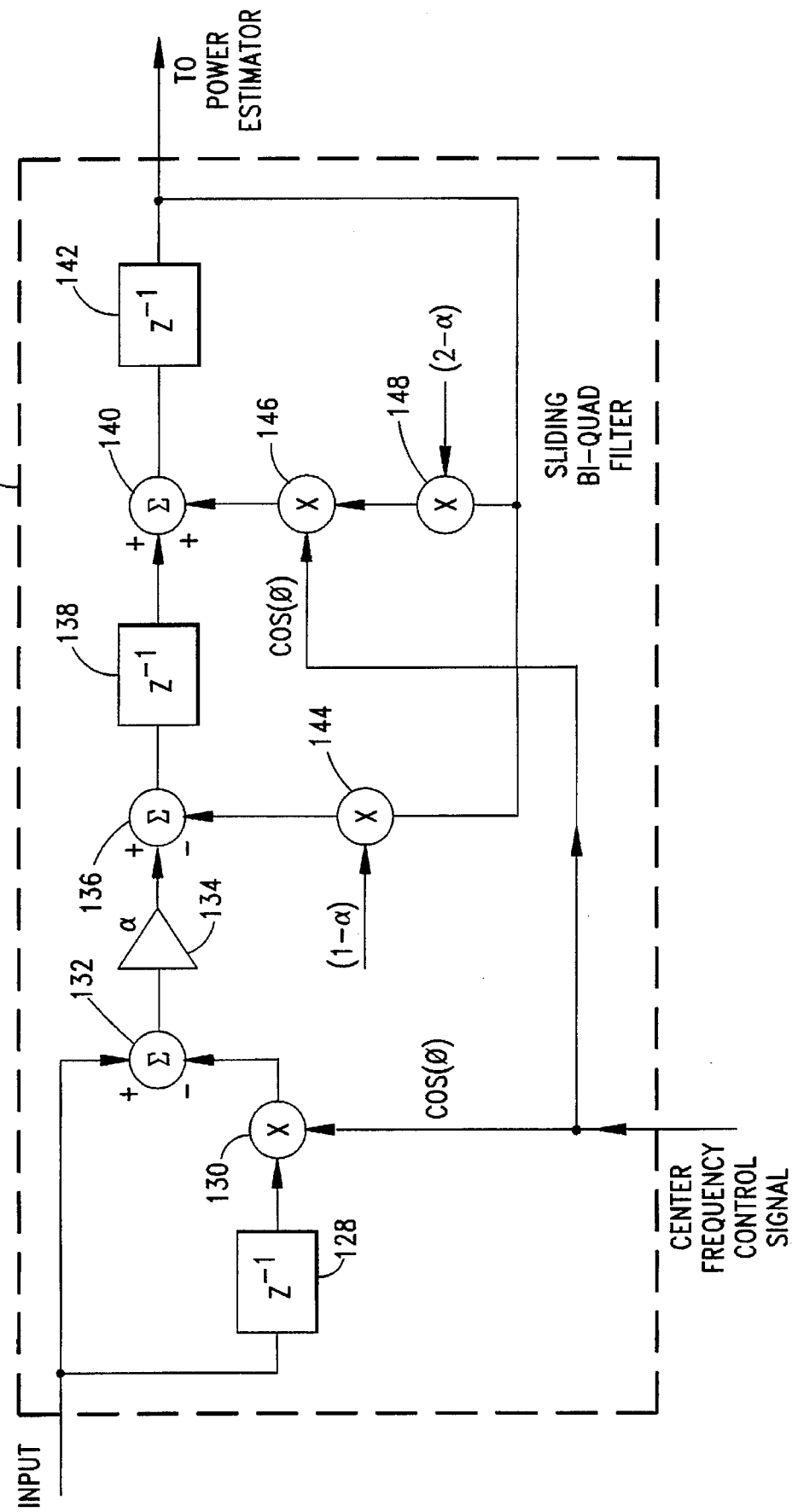
FIG. 3 is a schematic block diagram of a sliding bi-quadratic filter circuit, implemented in accordance with the present invention, suitable for use as the sliding passband filter illustrated in FIG. 2.

Referring now to FIG. 3, there is illustrated a sliding bi-quadratic filter 122' in its transposed form. The bi-quadratic filter 122 is suitable for use as the sliding passband filter 122 illustrated in FIG. 2.

As illustrated, the sliding bi-quadratic filter 122' comprises a HDTV signal input coupled to an input of a first unit delay element 128 and a summing input of a first summer 132. The output of the first unit delay element 128 is multiplied with the center frequency control signal, which has the value $\cos(\phi)$, to generate a signal which is supplied to a subtracting input of the summer 132. The output of the summer 132 is supplied to a gain element 134 which has a preselected gain $\alpha$. The output of the gain element 134 is coupled to a summing input of a second summer 136 which, in turn, has an output coupled to the input of a second unit delay element 138.

The output of the second unit delay element 138 is coupled to the input of a first summing input of a summer 140 which, in turn, has an output coupled to a third unit delay element 142. The output of the third unit delay element 142 is an estimated power signal which represents the estimated power of the filtered HDTV signal. The output of the third unit delay element 142 is coupled to the estimated power level input of the FCTC module 126 and to a first input of second and third multipliers 144, 148.

The second multiplier 144 multiplies the estimated power signal with a signal having the value $(1-\alpha)$ while the third multiplier 144 multiplies the estimated power signal with a signal having the value $(2-\alpha)$. The output of the second multiplier 144 is supplied as a feedback signal to a subtracting input of the second summer 136. α, as will be described below, is a filter coefficient which controls the bandwidth of the filter 122'.

The output of the third multiplier 148 is coupled to the input of a fourth multiplier 146, which multiplies the output of the third multiplier 148 with the center frequency control signal cos(φ) to produce a signal which is supplied to a second summing input of the third summer 140.

The bi-quadratic filter 125' has a bandwidth that is controlled primarily by the value of the coefficient, α, and a center frequency that is controlled by the value of the center frequency control signal. The center frequency control signal which has the value cos (φ), serves as a filter coefficient. The transfer function of the sliding bi-quadratic filter 122' is as follows:

$$H(\omega) = \frac{\alpha(1 - \cos(\phi)Z^{-1})}{1 - (2 - \alpha)\cos(\phi)Z^{-1} + (1 - \alpha)Z^{-2}}$$

A review of the above transfer function reveals that the filter 122' is resonant at the radian frequency of φ. To insure maximum selectivity, the sliding bi-quadratic filter's bandwidth must not be too wide, e.g., it should not be much larger than the expected bandwidth of the VSB pilot tone. A narrow filter 123', i.e., a filter with a narrow passband, can be used to easily isolate the pilot tone of a VSB signal thereby providing a robust QAM/VSB detector. In addition, the use of a narrow filter 123 can provide information on the actual frequency location of the VSB pilot tone. Such information can be supplied to other demodulation circuits, e.g., carrier recovery circuits to be used during carrier recovery.

It has been found by experimentation that the use of an α having a value of $2^{-8}$ provides a good compromise between filter bandwidth and the required filter bit precision. However, other values for α are possible.

In a system with a sampling rate of 20 MHz, a value of $2^{-8}$ for α will provide a filter having the above transfer function with a passband of approximately 12 kHz.

To avoid frequency gaps while sweeping the sliding filter 122', the sliding filter 122' should be moved in steps of approximately ½ the bandwidth or smaller. Naturally, smaller step sizes allow for finer tuning of the filter 122' in search of a VSB pilot tone.

In view of current hardware considerations, a step size of approximately 1.5 kHz should provide a good compromise between hardware complexity and detection selectivity.

As discussed above, to move the sliding filter 122, 122' across the frequency range of interest, the center frequency control signal representing the cos(φ) coefficient is varied.

Generally, it can be assumed that the tuner 104 will place the received HDTV signal at a frequency suitable for sampling. For example, in one exemplary embodiment, the tuner centers the HDTV signal at 5 MHz, with the lower band edge extending down to approximately 2 MHz. In such a case, the VSB pilot tone will be located somewhere near the band edge, nominally 300 kHz up from the lower band edge of the HDTV signal.

Digital systems, such as the sliding filter 122, usually normalize to the sampling rate. For purposes of this example, we will assume that the sampling rate is 20 MHz and that the pilot tone nominally appears at 2.5 MHz. Normalized to the sampling rate, the pilot tone should appear at 0.125. To place the center of the bi-quadratic filter 122' at this normalized frequency, the cos(φ) coefficient should have the value of cos(0.1252*2*π) which equals 0.707106781187. This value, if fully represented, would require a very high degree of bit precision. To accommodate implementation using a reasonable amount of hardware, the value, in accordance with the present invention, is approximated to a few bits of precision. Experimentation has shown that 11 bits of precession for the cos(φ) filter coefficient values allows for a 1.5 kHz stepping resolution while not requiring a large amount of bit precision in the filter coefficients. The value of 0.707106781187 quantized to 11 bits of precision yields 0.70703125. This value, which is equal to 20E6*((ACOS(0.70703125)/(2π))-0.125)), corresponds to a frequency error of 340 Hz with a sampling rate of 20 MHz. If a table of quantized cosine values is formed over a selected search region, one will quickly notice that the cosine values in the table increment by at most, one bit for every table entry. This can be seen from the fourth column of values illustrated in the table of FIG. 8.

Referring now to FIG. 8, the first column lists the normalized search frequency. The second column lists the full precision cosine values, cos(φ), of the normalized search frequencies listed in the first column of FIG. 8. Thus, the values in column 2 are equal to cos(2π(normalized frequency)). The third column of FIG. 8 lists the cos(φ) values of column 2 quantized to be represented using 11 bits of precision. The fourth column of FIG. 8 lists the actual binary bit sequence used to represent the quantized cos(φ) values listed in the third column of FIG. 8.

Referring now to the fourth column of the table illustrated in FIG. 8, it can be seen that the bit sequence from one search frequency to the next changes by at most only one bit. It can also be seen that the last 8 bits are the only bits that change for the selected search region of 0.12 to 0.13 in terms of normalized frequency. The fact that over the selected search range the last 8 bits for the quantized values of cos(φ) change by, at most, one bit and in a linear manner, allows the center frequency of the sliding filter 122 to be moved in the steps shown by supplying the sliding filter's center frequency control signal input with a value which corresponds to the last 8 bits of the cos(φ) coefficient which change over the search region concatenated with the fixed three higher order bits.

The changing 8 bit value can be supplied using, e.g., an 8 bit counter such as the counter 164 illustrated in FIG. 5. The counter 164 is incremented to supply successive values. In such an embodiment, the counter status represents the last 8 bits of the cos(φ) values and the first 3 bits are always held constant to 0.101. The concatenation of the two bit sequences represents the actual values used as a cosine table. The circuitry for concatenating the two bit sequences can be incorporated into the 8 bit counter circuit 164 so that the output of the counter 164 is actually an 11 bit sequence or can be performed subsequent to the counter output. By using a counter in this manner to provide cos(φ) values the need for a ROM lookup table including such values is avoided.

As discussed above, the output of the counter 164 is used to control and change the frequency of the sliding passband filter 122 so that it sweeps across the frequency range of interest, i.e., the frequency range in which the VSB signal is expected to be located. As discussed above, it is the job of the power estimation circuit 124' to generate a signal, i.e., a power estimation signal, representing the estimated power of the HDTV signal passed by the passband filter 122 at each frequency location.

Figure 4:
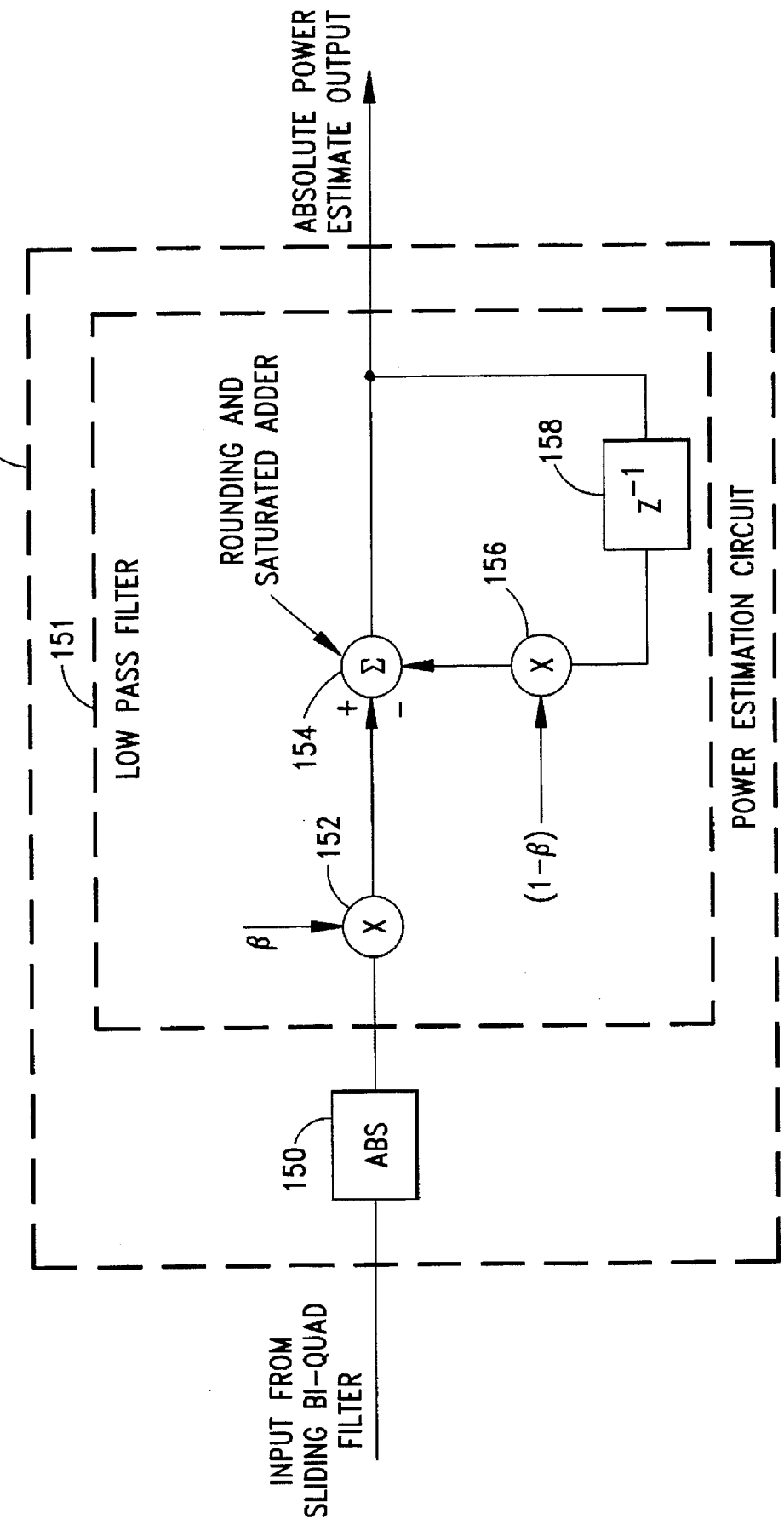
FIG. 4 is a schematic block diagram of a power estimation circuit suitable for use as the power estimation circuit illustrated in FIG. 2.

Referring now to FIG. 4, the operation of the power estimation circuit 124 of the present invention will now be described in detail.

As illustrated in FIG. 4, in one embodiment of the present invention, the power estimation circuit 124 comprises an absolute value ("ABS") circuit 150, and a low pass filter 151 comprising a first multiplier circuit 152, a summer 154, a unit delay element 158 and a second multiplier 156.

The ABS circuit 150 receives the filtered HDTV signal output by the passband filter 122 and performs an absolute value operation thereon. The output of the ABS circuit is supplied to the input of the first multiplier of the low pass filter 151 which multiplies the signal with the value B. The output of the multiplier 152 is coupled to a summing input of a rounding and saturated adder circuit 154 which generates the estimated power signal which represents an estimation of the power of the filtered HDTV signal. The unit delay element 158 feeds back the estimated power signal to a subtracting input of the rounding and saturated adder 154 via the second multiplier 156. Prior to supplying the power estimation signal to the subtracting input of the rounding and saturated adder circuit 154, the multiplier 156 is used to multiply the delayed power estimation signal with a signal have a value equal to (1−B), where B corresponds to a preselected value used to control the bandwidth of the lowpass filter 151.

In the above described manner, the filtered HDTV signal output by the sliding passband filter 122 is supplied to the input of the power estimation circuit 124. The absolute value of the filtered HDTV signal is taken by the ABS circuit 150 to generate a signal which is then low pass filtered to generate the signal representing the estimated power of the filtered HDTV signal.

The value B should be set to a value which provides a reliable estimate of the average power of the filtered HDTV signal while also acting as a fast time constant to allow for fast measurements as the passband filter 122 sweeps the desired search region. A good compromise between the two factors, i.e., reliability of the estimated power and fast measurement times, has been found to be a B of $2^{-13}$. Accordingly, in one embodiment of the present invention B is set to equal $2^{-13}$. This value allows for relatively quick power measurements at the frequencies listed in FIG. 8, while maintaining a reliable power estimate of a filtered HDTV signal's average power under adverse channel conditions.

Figure 6:
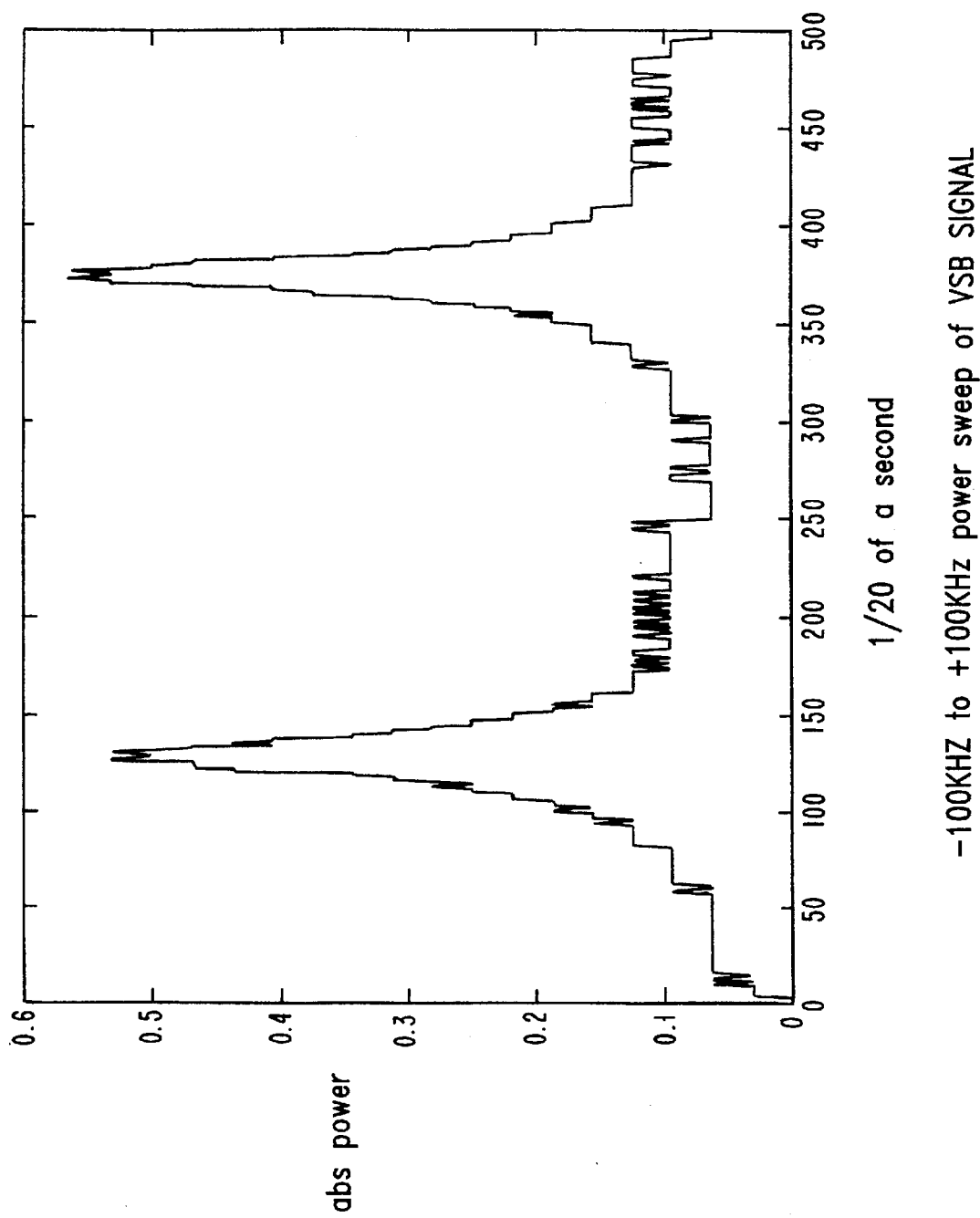
FIG. 6 is an exemplary diagram illustrating the absolute power of a filtered VSB signal measured by the power estimation circuit of the present invention, as the frequency of the sliding bi-quadratic filter of FIG. 4 is adjusted over a 200 KHz range in a time period corresponding to $\frac{1}{20}$ of a second.

Referring now to FIG. 6, there is illustrated a plot of the estimated power signal generated by the power estimation circuit 124 when a VSB signal is applied to the modulation recognition circuit 120 in the case where B has the value $2^{-13}$. In FIG. 6, the modulation recognition circuit 120 has performed two sweeps of the search region from normalized frequencies 0.12 to 0.13. Using a sampling rate of 20 MHZ, this represents a sweep of −100 kHz to +100 KHz about a frequency 2.5 MHz (0.125 normalized). Notice that for each 200 kHz sweep, which lasts for 1/40th of a second, a large peak has occurred. Each peak corresponds to the precise location of the VSB pilot tone.

Figure 7:
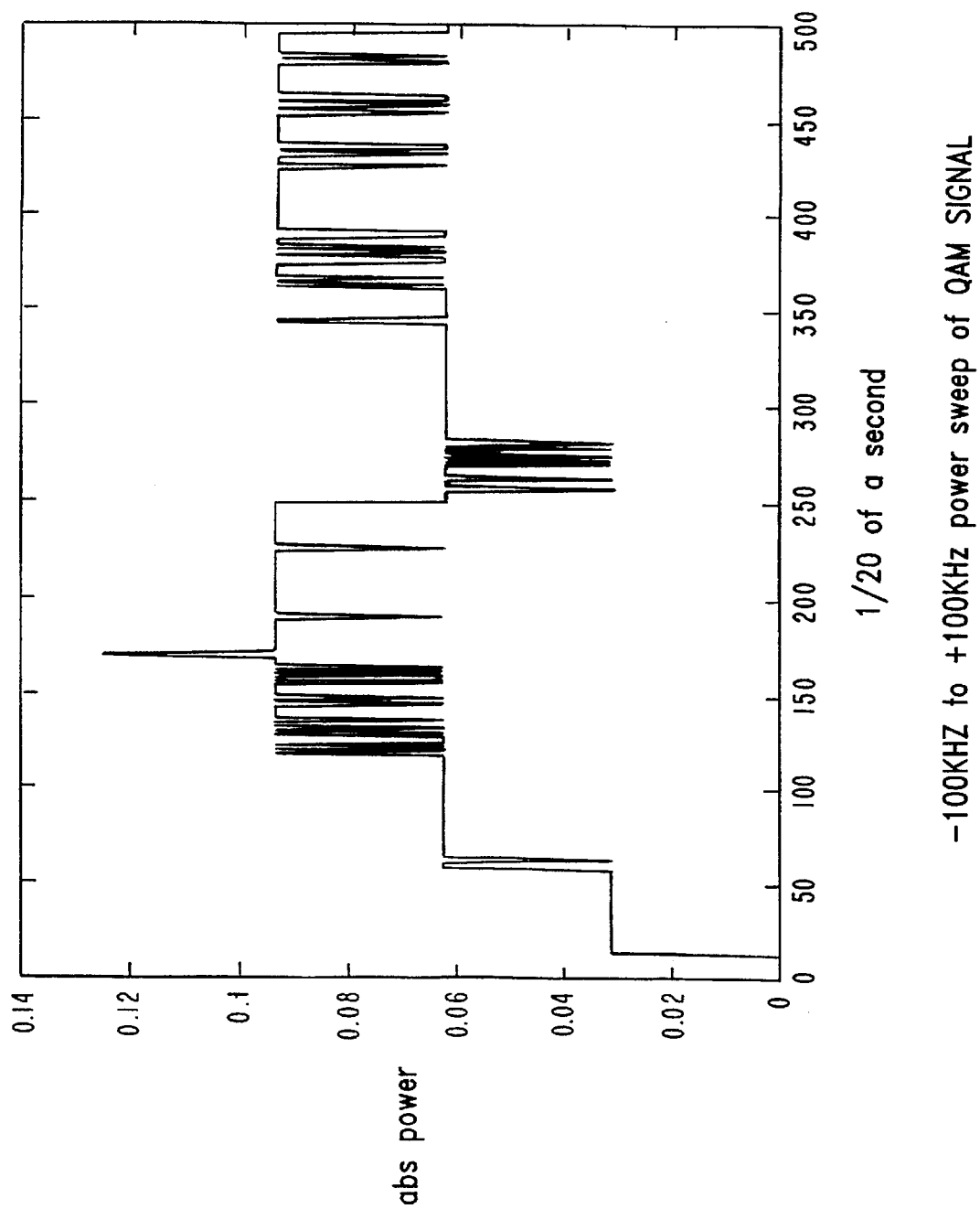
FIG. 7 is an exemplary diagram illustrating the absolute power of a filtered QAM signal measured by the power estimation circuit of the present invention, as the frequency of the sliding bi-quadratic filter of FIG. 4 is adjusted over a 200 KHz range in a time period corresponding to $\frac{1}{20}$ of a second.

Referring now to FIG. 7, notice the same plot when a QAM signal, as opposed to a VSB signal, is applied to the modulation recognition circuit 120. Note that the vertical scale on the plot of FIG. 7 terminates at 0.14 while the vertical scale of the plot of FIG. 6 terminates at 0.6.

The most obvious fact in comparing the plots of FIGS. 6 and 7 is that the QAM plot of FIG. 7 has no clearly defined peaks that last for any meaningful duration as compared to the VSB plot. This is due to the fact that QAM does not have a highly isolated concentration of power as does VSB which uses a pilot tone. Also notice that the scale on FIG. 7 is much smaller than that of FIG. 6.

The exemplary plots of FIGS. 6 and 7 are representative of the power estimation signals generated from VSB and QAM signals that are expected to be supplied to the modulation recognition circuit 120. It is clear from a review of FIGS. 6 and 7 that a simple threshold comparator can be used to determine if a VSB signal is being received or if a QAM signal is being received.

Figure 5A:
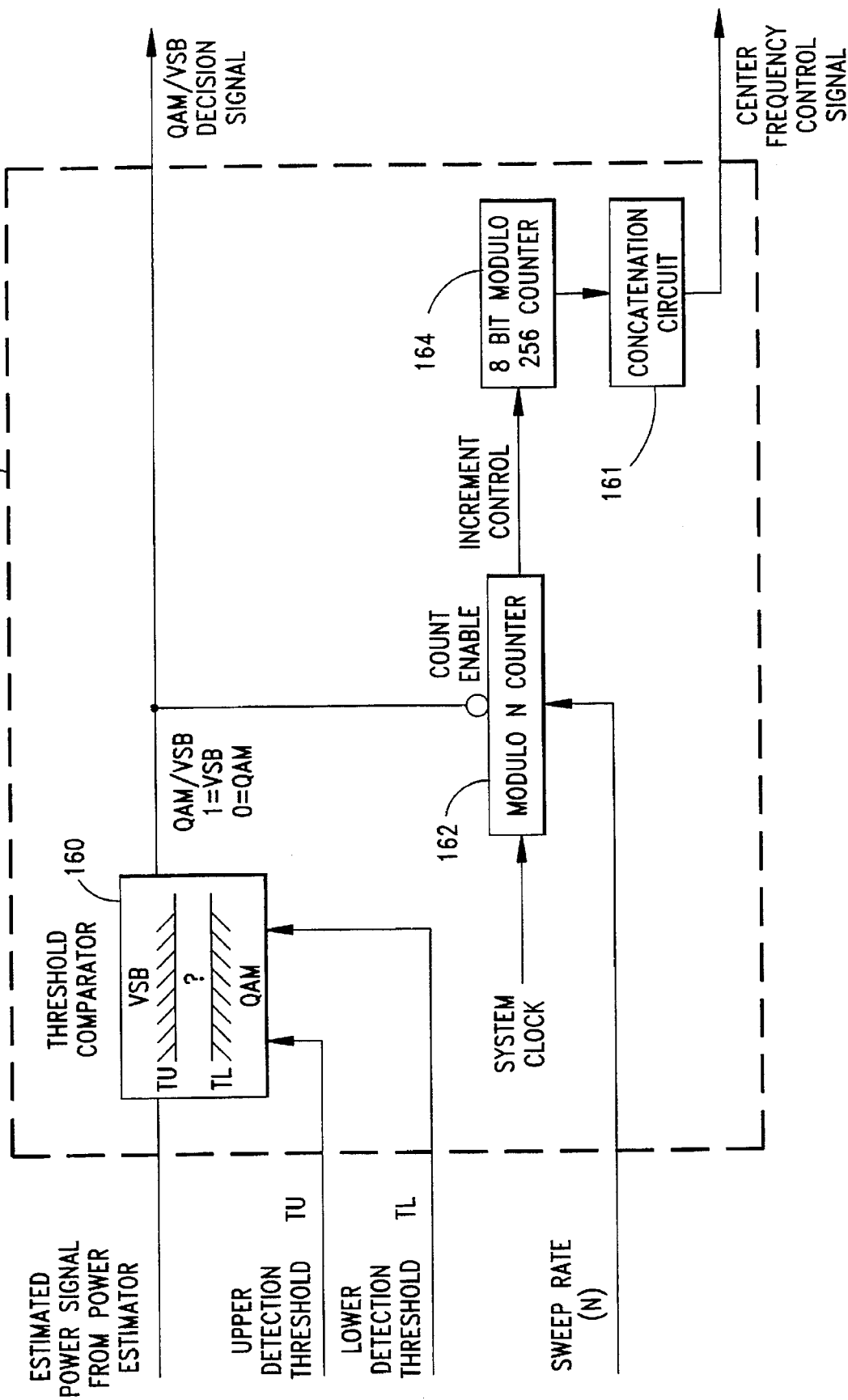
FIGS. 5A and 5B are schematic block diagrams of frequency control and threshold comparator modules implemented in accordance with first and second embodiments fo the present invention, suitable for use as the frequency control and threshold comparator module illustrated in FIG. 2.

Referring now to FIG. 5A, the operation of an FCTC module 126' suitable for use as the FCTC circuit 126 in accordance with a first embodiment of the present invention will now be described.

The FCTC module 126' comprises a threshold comparator 160, a modulo N counter 162 and an 8 bit modulo counter 164 and a concatenation circuit 161. As illustrated, the threshold comparator 160 receives as inputs the estimated power signal output by the power estimation circuit 124', the upper detection threshold value and the lower detection threshold value.

The comparitor compares the estimated power level of the filtered HDTV signal to the upper and lower detection thresholds. If the upper detection threshold, which is a value which a QAM signal is not expected to reach, is exceeded, VSB is declared present and the comparator 160 asserts its output signal which represents the decision signal. However, if the estimated power level falls below the lower detection threshold value, which is a value that a VSB signal in the frequency search region is not expected to be below, QAM is declared present. The output of the threshold comparitor 160 is coupled to a count enable input of the modulo N counter 162. The modulo N counter also receives as inputs a system clock signal and the sweep rate signal which represents an integer value N. When the counter 162 is enabled, as a result of the decision signal being low indicating a QAM signal, the output of the counter 162 is asserted once for ever N system clock cycles. The output of the counter 162 is used to drive the 8 bit counter 164 which is responsible for controlling the shifting of the center frequency of the sliding filter 122. The output of the 8 bit counter 164 represents the last 8 bits of the cos(φ) values of the filter center frequency control signal. The first 3 bits of the 11 bit center frequency control signal are supplied by the concatenation circuit which concatenates the first 3 bits having a fixed value to the last 8 bits to generate the 11 bit center frequency control signal output by the FCTC module 126'.

As discussed above, in accordance with the first embodiment of the present invention, the upper detection threshold and lower detection threshold are used to determine if a VSB signal is present. In accordance with the first embodiment, once the estimated power signal output by the power estimation circuit 124 exceeds the upper detection threshold a VSB signal is declared present and the filter 122 is stopped from sliding across the search region. Once the filter 122 is stopped, the power output measured should remain high, hence allowing the threshold to be exceeded absent any change in the location of the VSB pilot tone. If the pilot tone moves, the VSB signal is removed, and/or if the HDTV signal is changed to QAM, the value of the power estimation signal will drop below the preselected lower detection threshold. In such a case, the counter 162 is restarted and the filter 122 is allowed to once again scan for the VSB pilot tone.

In accordance with the first embodiment, to avoid the demodulation circuitry of the receiver 100 from falsely configuring itself if the HDTV signal suddenly experiences a large disturbance or dropout, a microprocessor is used to read the VSB/QAM detection signal output after a change in the VSB/QAM detection output signal is made.

If the output of the modulation recognition circuit fails to remain constant, the microprocessor prevents the receiver's demodulation circuitry from switching modes in response to the transient change in the VSB/QAM detection signal. In this manner, the microprocessor prevents the demodulation circuitry of the receiver 100 from falsely configuring itself if the HDTV signal suddenly experiences a large disturbance or dropout and then returns to the original state. Because the microprocessor checks the output of the modulation recognition circuit a short period of time after the generation of the reset signal, the configuration control which prohibits the immediate reconfiguring of the demodulation circuitry will be in effect for only a short period of time after the reset pulse has been executed. After the short period of time, the demodulator circuitry will either be reconfigured or the transient change will be ignored.

Figure 5B:
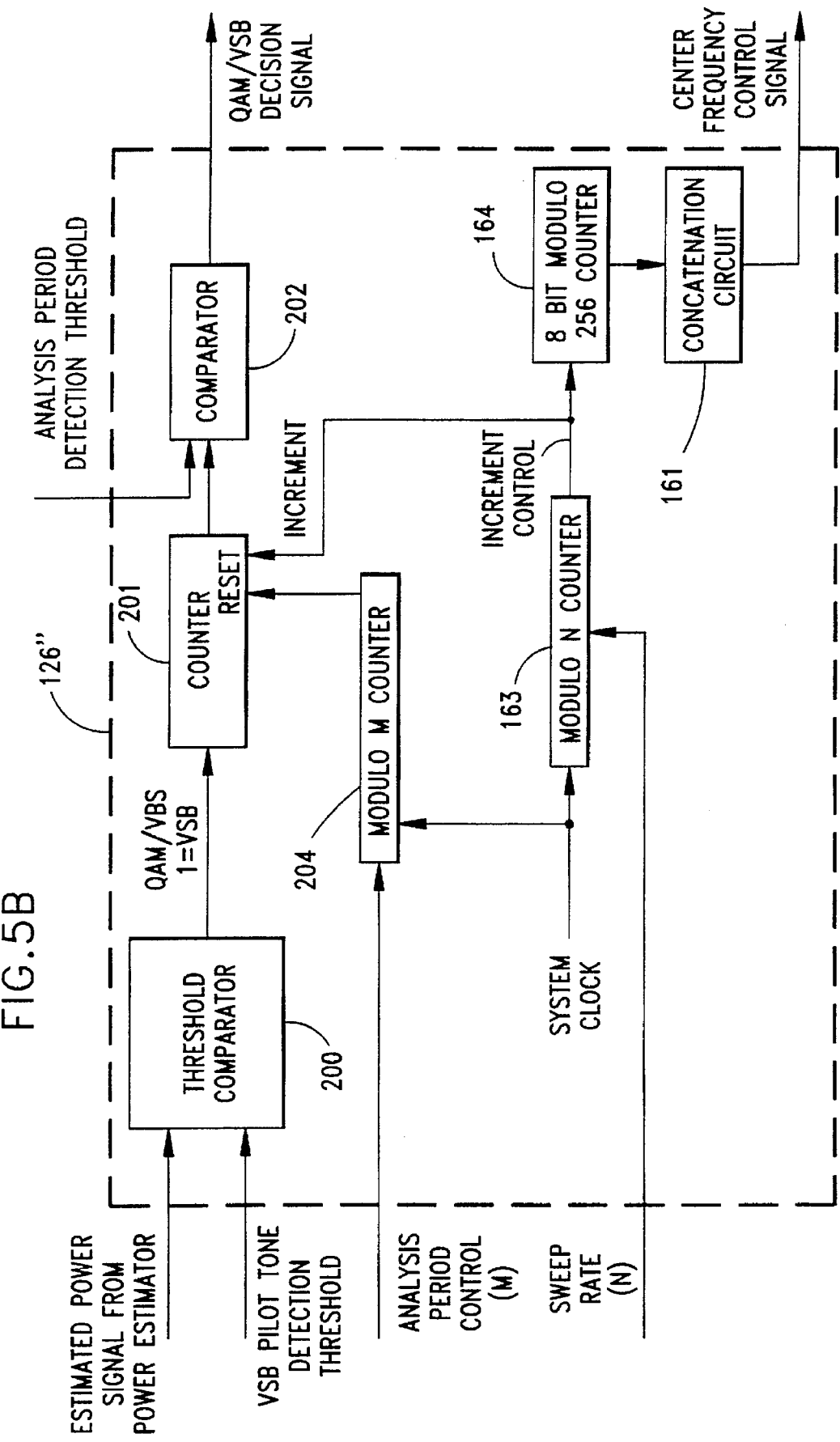

Referring now to FIG. 5B, there is illustrated an FCTC module 126', suitable for use as the FCTC circuit 126 of FIG. 1, in accordance with the second embodiment of the present invention. As illustrated the FCTC module 126' comprises first and second threshold comparators 200, 202, a modulo M counter 204, a modulo N counter 163, a counter 201, the 8 bit modulo counter 164 and the concatenation circuit 161.

Generally, there are two important timing controls which the FCTC module 126' is responsible for. The first of these is the measuring of power measurement time periods which are determined as a function of the sweep rate. The second is the measuring of the analysis period during which measurements are made which result in the generation of the QAM/VSB decision signal.

The first timing control function is achieved using the modulo N counter 163. The modulo N counter 163 receives as its inputs the system clock signal and the sweep rate signal which has a value N. The modulo N counter generates an increment control signal at the end of each N system clock cycles. The increment control signal is used to increment the 8 bit modulo counter 164 as described previously in regard to FIG. 5A. It is also supplied to the counter 201 to serve as an increment enable signal.

The first threshold comparator 200 receives as inputs, the estimated power signal from the power estimation circuit 124 and the VSB pilot tone detection threshold. The first threshold comparator 200 compares the estimated power of the filtered HDTV signal to the VSB pilot tone detection threshold. If the threshold is exceeded, the threshold comparator generates a high ("1") output signal indicting that a VSB pilot tone has been detected. Otherwise, the first threshold comparator 200 generates a low ("0") output signal.

The counter 201, which receives as one of its inputs the output signal from the first threshold comparator 200, increments each time the output of the first threshold comparator 200 is high, indicating detection of a VSB pilot tone, and the increment control signal is asserted. If the increment control signal is asserted while the output of the first threshold comparator 200 is low, the counter 201 is not incremented. In this manner, the value generated by the counter 201 represents the number of times a VSB pilot tone was detected during an analysis period.

To reset the counter 201 at the end of each analysis period, the modulo M counter 204 is used to generate a reset signal. The modulo M counter 204 receives as its inputs the system clock signal and the analysis period control signal which represents an integer value M. The modulo M counter generates a reset signal every M system clock cycles.

Because the counter 201 increments once for each time a VSB pilot tone is detected, the counter 201, at the end of each analysis period, contains a number indicating the number of times during the analysis period a VSB pilot tone was detected. This number is supplied to the comparator 202 and compared with the analysis period detection threshold which is also supplied as an input to the second comparator 202. If the number output by the counter 201 at the end of an analysis period exceeds the analysis period detection threshold value, a decision signal indication of the presence of a VSB signal is generated. Otherwise, a decision signal indicating the presence of a QAM signal is generated.

In accordance with the second embodiment of the present invention, which utilizes a two step decision method of detecting the presence of a VSB pilot tone, the counter 164 is allowed to continuously sweep through the preselected frequency range in which the presence of a VSB pilot tone is to be detected. By requiring that a VSB pilot tone be detected multiple times during a preselected sampling period, signal noise and other types of interference are less likely to result in a false VSB decision signal being generated than is the case with the first embodiment of the present invention.

In experiments, the above described modulation techniques of the present invention have been found to be capable of accurately identifying the type of modulation being used in well under 25 seconds.

Figure 9:
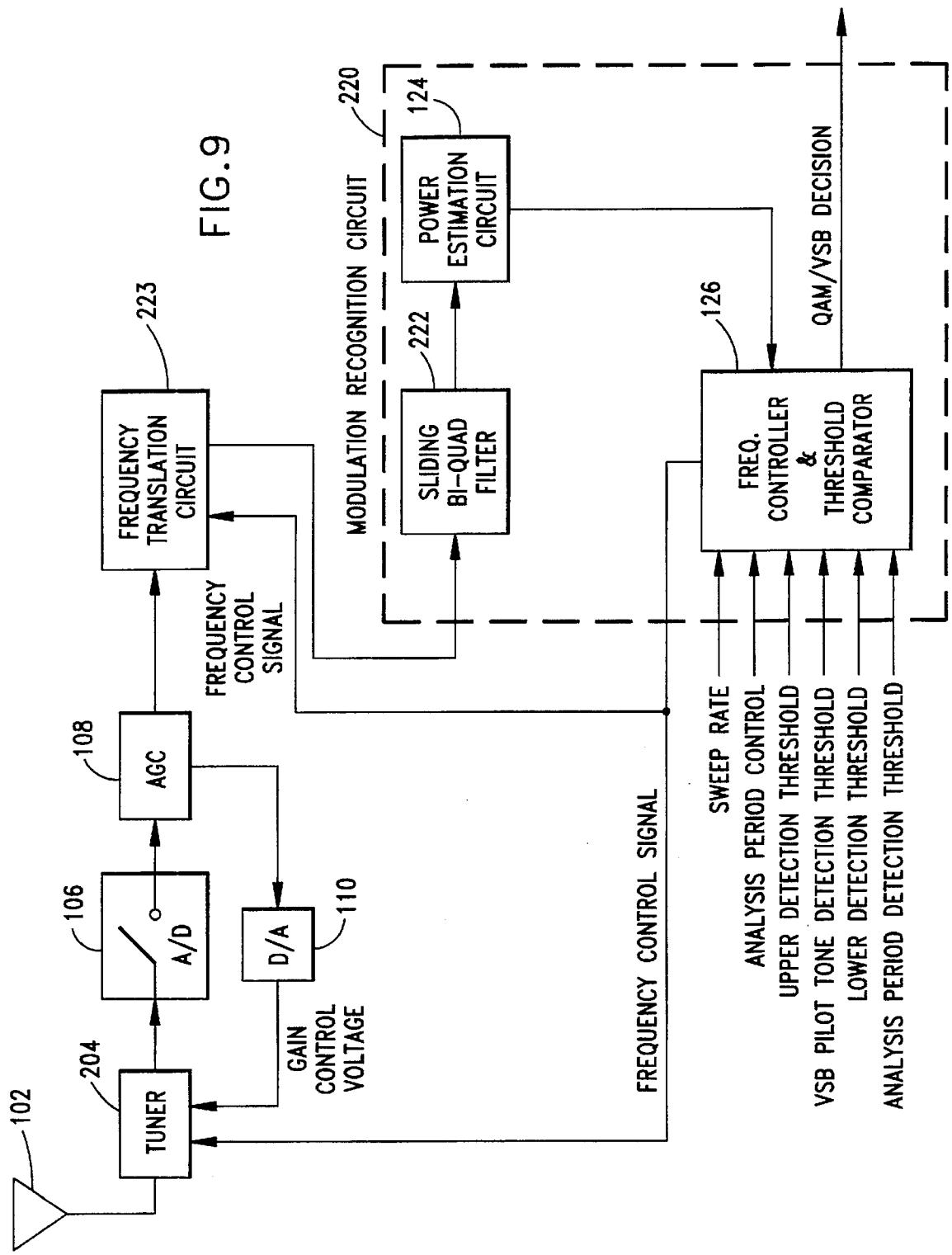
FIG. 9 is an illustration of a receiver circuit implemented using a fixed passband filter in accordance with an exemplary embodiment of the present invention.

The modulation recognition circuit 120 of the present invention can be implemented using a variety of techniques in addition to those discussed above. Referring now briefly to FIG. 9, there is illustrated a receiver 200 of the present invention, implemented in accordance with some additional embodiments discussed below. Circuit elements that are the same as or similar to those of FIG. 2 are referred to using the same reference numbers and will not be described again in detail.

As illustrated in FIG. 9, rather than using a sliding passband filter 122, a fixed frequency passband filter 222 can be implemented using fixed weights and having a fixed center frequency. In such an embodiment, the HDTV signal itself is sweep across the fixed passband filter 222. This sweeping of the HDTV signal can be accomplished in a number of ways. One way is to supply a control signal to the tuner 204 which can be made to sweep its output until the pilot tone is placed into the center of the fixed passband filter 222. Thus, the tuner serves as a frequency translation device. In such an embodiment, the same threshold detection circuitry described in regard to the first and second embodiments of the present invention can be used to make the determination of whether or not VSB was present. However, such an embodiment permits a simpler implementation of the passband filter since it is implemented using fixed weights.

This alternative embodiment which uses a passband filter 222 having a fixed center frequency has the disadvantage, as compared to the other embodiments, of requiring the tuner to move its output in controllable, fine increments. This approach may also require a longer time to sweep the analog signal output by the tuner across the frequency search region.

In still another embodiment, the tuner's output is digitally swept across the passband filter 222. This can be done by using a frequency translation circuit 223 operated in conjunction with the FCTC circuit 126. In such an embodiment, a ROM table that stores SIN/COS values used for mixing may be included as part of the FCTC circuit 126 or the frequency translation circuit 223. This approach requires a full multiplier to do the actual mixing operation. The mixing can be done using real or complex signals via the use of, e.g., a Hilbert transform filter. It is expected that both the real and complex digital mixing techniques will require more hardware to implement than the sliding bi-quadratic passband filter approach previously described. It should be noted that when the tuner 204 is used to sweep the received signal, the frequency translating circuit 223 is not required.

The above description sets forth an effective approach to determining whether a VSB or QAM HDTV signal is being received without having to demodulate the HDTV signal. If one is willing to demodulate the received signal, one could first try to demodulate the HDTV signal under the assumption that VSB is being received and if no appropriate lock signals are formed, then try a QAM demodulator on the received signal. This technique has the drawback that it requires two separate demodulators for modulation recognition and it is also slow to recognize the correct modulation technique since it requires an attempt to demodulate the signal to determine which modulation technique is correct.

What is claimed is:

1. A modulation type recognition apparatus for determining if a received signal is a signal of a first modulation type which includes a pilot tone in the signal, the apparatus comprising:
   a sliding passband filter for receiving and filtering the signal;
   a power estimation circuit coupled to the sliding passband filter for generating an estimate of the power of the filtered signal;
   a frequency sweep control circuit coupled to the sliding passband filter for sweeping the center frequency of the sliding passband filter through a preselected sequence of frequencies; and
   a modulation type decision means coupled to the power estimation circuit for generating a modulation type decision signal, as a function of a comparison of the estimated power of the filtered signal to a first threshold detection value.

2. The apparatus of claim 1,
   wherein the modulation type decision means includes means for generating the modulation type decision signal as a function of a comparison of the estimated power of the filtered signal to a second threshold value in addition to the first threshold detection value.

3. The apparatus of claim 2, wherein the sliding passband filter is a digital passband filter having a passband of 12 kHz or less in width; and
   wherein the first modulation type is a vestigal sideband signal type.

4. The apparatus of claim 1,
   wherein the center frequency of the sliding passband filter is controlled by a set of bits representing a filter weight; and
   wherein the frequency sweep control circuit includes a first counter for generating a first series of bits which are used to generate the set of bits representing the filter weight.

5. The apparatus of claim 4, wherein the frequency sweep control circuit further includes:
   a concatenation circuit coupled to the counter for concatenating a second series of stored bits with the first series of bits to generate the set of bits representing the filter weight.

6. The apparatus of claim 5, wherein the frequency sweep control circuit further includes:
   a second counter coupled to an increment input of the first counter and being adapted for receiving a system clock signal and a sweep rate value N, the second counter generating one increment signal for every N system clock cycles where N is an integer.

7. The apparatus of claim 6,
   wherein the modulation type decision signal has a value which is one of a first value indicative of the detection of a vestigial sideband signal and a second value which is indicative of the detection of a quadrature amplitude modulated signal; and
   wherein the modulation type decision means includes a first threshold comparator for comparing the estimated power of the filtered signal to the first threshold detection value, the first threshold comparator generating a decision signal having the first value when the estimated power of the filtered signal exceeds the first threshold detection value.

8. The apparatus of claim 6, further comprising:
   a system clock for generating a system clock signal;
   wherein the frequency sweep control circuit further comprising means for changing the center frequency of the sliding passband filter once every N cycles of the system clock signal; and
   wherein the modulation type decision means includes:
   i. means for comparing the estimated power of the filtered signal to a VSB pilot tone detection threshold and for generating a comparator output signal indicative of the comparison result;
   ii. counter means responsive to the comparator output signal, for incrementing a count once for every N system clock cycles that the comparator output signal indicates that the estimated power of the filtered signal exceeded the VSB pilot tone detection threshold; and
   iii. means for setting the state of the generated modulation type decision signal to a first state indicative of the detection of a vestigial sideband signal when the count generated by the counter means exceeds an analysis period detection threshold at the end of a period of M system clock cycles and for setting the generated modulation type decision signal to a second state indicative of the detection of a signal other than a vestigial sideband signal at the end of the period of M system clock cycles when the count generated by the counter means does not exceed the analysis period detection threshold at the end of the period of M system clock cycles.

9. The apparatus of claim 1, wherein the modulation type decision signal has a value which is one of a first value indicative of the detection of a vestigial sideband signal and a second value which is indicative of the detection of a quadrature amplitude modulated signal.

10. The apparatus of claim 9, wherein the modulation type decision means includes a first threshold comparator for comparing the estimated power of the filtered signal to the first threshold detection value, the first threshold comparator generating a decision signal having the first value when the estimated power of the filtered signal exceeds the first threshold detection value.

11. The apparatus of claim 10, wherein the first threshold comparator generates a decision signal having the second value when the estimated power of the filtered signal is below a second detection threshold value and does not alter the value of the generated decision signal when the estimated power of the filtered signal is equal to or between the first and second decision threshold values.

12. The apparatus of claim 1, further comprising:
   a system clock for generating a system clock signal;
   wherein the frequency sweep control circuit further comprises means for changing the center frequency of the sliding passband filter once every N cycles of the system clock signal, where N is an integer; and wherein the modulation type decision means includes:

i. means for comparing the estimated power of the filtered signal to a VSB pilot tone detection threshold and for generating a comparator output signal indicative of the comparison result;

ii. counter means responsive to the comparator output signal, for incrementing a count once for every N system clock cycles that the comparator output signal indicates that the estimated power of the filtered signal exceeded the VSB pilot tone detection threshold; and iii. means for setting the state of the generated modulation type decision signal to a first state indicative of the detection of a vestigial sideband signal when the count generated by the counter means exceeds an analysis period detection threshold at the end of a period of M system clock cycles and for setting the generated modulation type decision signal to a second state indicative of the detection of a signal other than a vestigial sideband signal at the end of the period of M system clock cycles when the count generated by the counter means does not exceed the analysis period detection threshold at the end of the period of M system clock cycles.

13. A method of determining whether a received signal is a vestigial sideband signal comprising the steps of:

filtering the received signal using a sliding passband filter to generate a filtered signal corresponding to the portion of the received signal passed by the passband filter;

controlling the center frequency of the sliding passband filter to sweep across a preselected frequency region corresponding to the region of a vestigial sideband signal in which a pilot tone is located;

estimating the power of the filtered signal as the sliding passband filter sweeps across the preselected frequency region;

comparing the estimated power of the filtered signal to a preselected upper threshold detection value and a preselected lower threshold value, the preselected upper threshold value corresponding to a power level which will be exceeded when a VSB pilot tone is located within the passband of the sliding passband filter, the lower threshold value corresponding to a power level which will not be exceeded when a quadrature amplitude signal is received;

generating a modulation type signal, the modulation type signal having a first value indicative of the vestigial sideband signal when the upper threshold value is exceeded by the estimated power of the filtered signal and having a second value indicative of the quadrature amplitude modulated signal when the estimated power of the filtered signal is below the lower detection threshold.

14. The method of claim 13, further comprising the step of:

stopping the center frequency of the sliding passband filter from sliding when the upper threshold value is exceeded by the estimated power of the filtered signal.

15. The method of claim 14, wherein the step of:

controlling the center frequency of the sliding passband filter includes the step of:

incrementing a counter to generate a new value corresponding to a passband filter weight.

16. A method of determining whether a received signal is a vestigial sideband signal comprising the steps of:

filtering the received signal using a sliding passband filter to generate a filtered signal corresponding to the portion of the received signal passed by the passband filter;

controlling the center frequency of the sliding passband filter to sweep across a preselected frequency region corresponding to the region of a vestigial sideband signal in which a pilot tone is located;

estimating the power of the filtered signal as the passband filter sweeps across the preselected frequency region;

comparing the estimated power of the filtered signal to a preselected pilot tone detection threshold;

maintaining a count of the number of times the estimated power of the filtered signal exceeds the preselected pilot tone detection threshold;

generating a modulation type signal, as a function of the count and an analysis period detection threshold value.

17. The method of claim 16, wherein the step of generating the modulation type signal includes the steps of:

at the end of an analysis period:

comparing the count to the analysis period detection threshold value at the end of the analysis period having a preselected duration; and setting the modulation type signal to a value indicative of the vestigial sideband signal if the count exceeds the analysis period detection threshold and to a value indicative of a signal other than the vestigial sideband signal if the count does not exceed the analysis period detection threshold.

18. The method of claim 17, wherein the step of:

controlling the center frequency of the sliding passband filter includes the step of:

incrementing a counter to generate a new value corresponding to a passband filter weight used to control the center frequency of the passband filter after a preselected period of time has passed, the preselected period of time being shorter than the analysis period.

19. The method of claim 18 wherein the analysis period is long enough to permit the passband filter to sweep through the entire preselected frequency region at least once.

20. A modulation type recognition apparatus for determining if a signal is a vestigial sideband signal, the apparatus comprising:

means for receiving and frequency translating the signal;

a fixed frequency passband filter coupled to the receiving and frequency translating means for filtering the received signal;

a power estimation circuit coupled to the fixed frequency passband filter for generating an estimate of the power of the filtered signal;

a frequency control circuit coupled to the receiving and translating means for controlling the translating means to sweep the received signal across a frequency range; and a modulation type decision means coupled to the power estimation circuit for generating a modulation type decision signal, as a function of a comparison of the estimated power of the filtered signal to a detection threshold.

* * * * *